Patented June 7, 1938

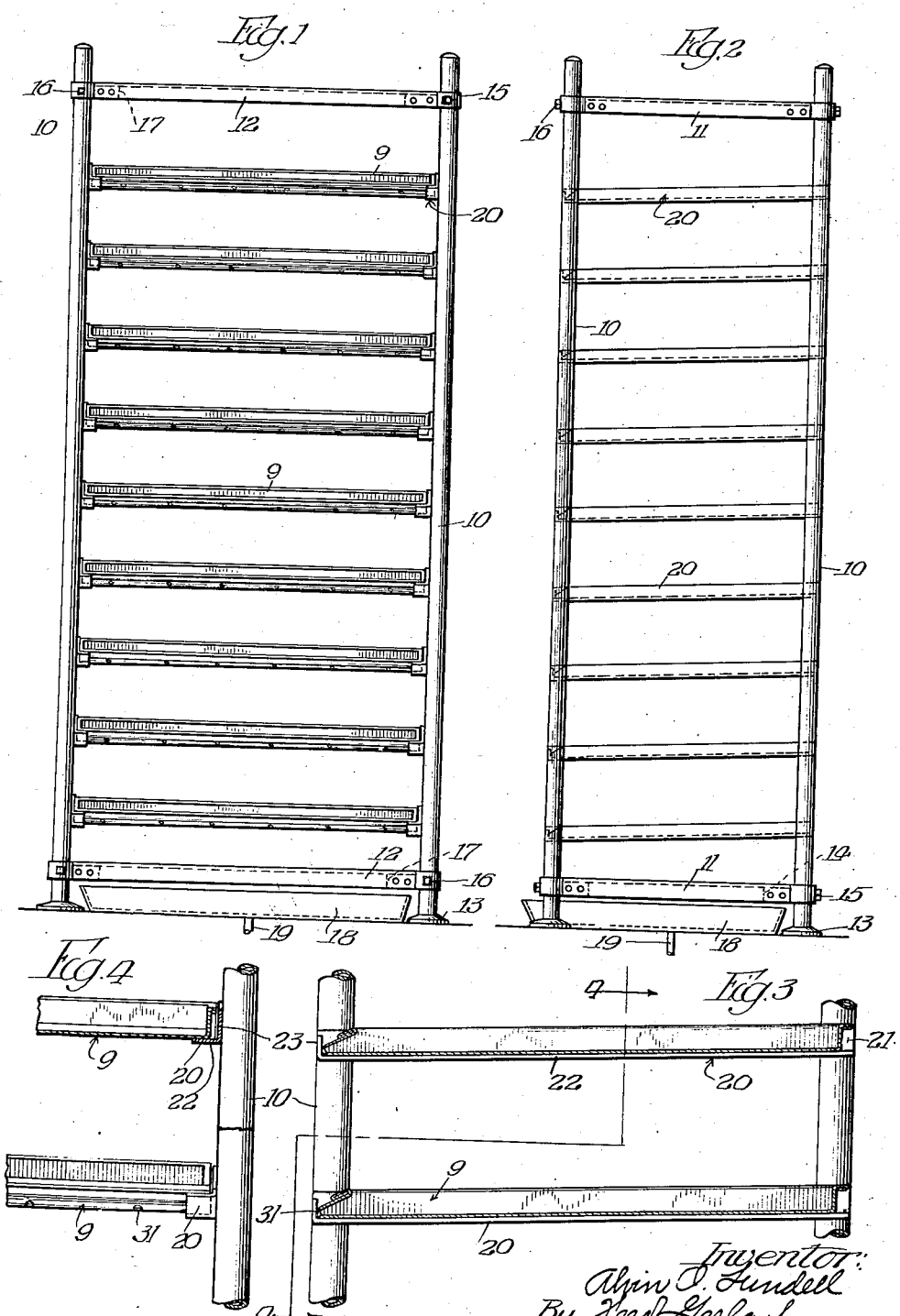

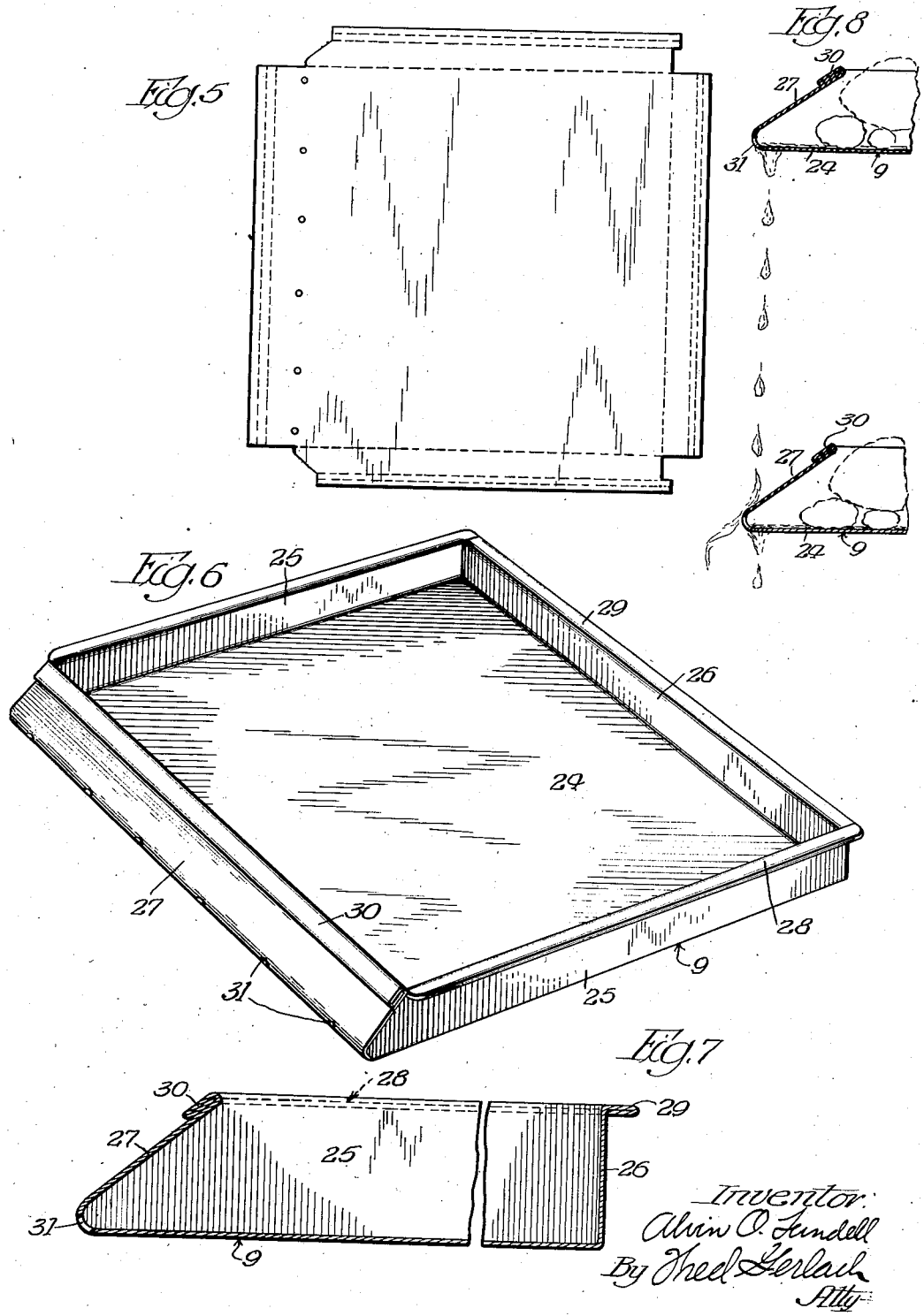

2,119,640

UNITED STATES PATENT OFFICE 2,119,640

APPARATUS FOR USE IN COOLING OFFAL

Alvin O. Lundell, Chicago, Ill., assignor to The Allbright-Nell Co., Chicago, Ill., a corporation of Illinois Application March 8, 1937, Serial No. 129,621

10 Claims. (Cl. 17—44)

The present invention relates generally to apparatus for use in cooling offal such for example, as head trimmings, snouts, ears, tongues, hearts, and sweetbreads. More particularly the invention relates to that type of apparatus which is adapted for disposition in a cooling room in a slaughter or meat packing establishment and comprises a rack of frame-like design and a plurality of offal retaining pans which have drain-holes in the front corners thereof and are carried by the rack so that they are disposed in vertically spaced relation and are also forwardly and downwardly inclined in order that the blood, slime, and other liquid substances which are associated with the offal run or flow downwards over the pan bottoms and drain from the pans by way of the aforesaid holes.

One object of the invention is to provide an apparatus of this type which is an improvement upon previously designed apparatus of the same general character and for the same purpose by reason of the fact that it includes simple and novel means whereby the drained substances from the pans, that is, the blood, slime, and other liquids which are discharged from the pans via the holes in the front corners are deflected so that they do not drop from one pan into the subjacent pan or pans.

Another object of the invention is to provide an apparatus of the last mentioned character in which the pan fronts extend upwardly and inwardly at approximately an angle of 45° with respect to the pan bottoms and constitute the deflector means for the drained substances.

A further object of the invention is to provide an apparatus of the aforementioned type and character which is generally of new and improved construction and may be manufactured at a low and reasonable cost.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front view of an apparatus embodying the invention;

Figure 2 is a side elevation showing the manner in which the rack of frame-like design carries the pans so that they are upwardly and downwardly inclined in order to cause the blood, slime, and other liquid substances to flow downwards on the pan bottoms and drain through the holes in the front corners of the pans;

Figure 3 is an enlarged sectional view through certain of the pans on the rack, illustrating the manner in which the forwardly and inwardly extending pan fronts serve to prevent the drainage from one pan entering or dropping into the subjacent pan;

Figure 4 is a view partly in section and partly in front elevation, taken on the line 4—4 of Figure 3;

Figure 5 is a plan view of one of the blanks which are used in the formation of the pans;

Figure 6 is a perspective view of one of the pans;

Figure 7 is an enlarged vertical transverse sectional view of the pan of Figure 6; and Figure 8 is an enlarged diagrammatic view showing the use of the deflector forming front walls of the pans.

The apparatus which is shown in the drawings constitutes the preferred embodiment of the invention. It is adapted for disposition in a cooling room in a slaughter or meat packing establishment and consists of a rack and a set or plurality of pans 9. The rack comprises uprights 10, side members 11, and cross-members 12, and is designed to rest upon the floor of the cooling room in which the apparatus is used. The uprights 10 are four in number and are arranged in rectangular relation, that is, two in front and two in back. Floor engaging feet 13 are fixed to the lower ends of the uprights. The side members 11 are in the form of angle iron bars and extend between the front and rear uprights. They serve to connect and hold in spaced relation the upper and lower ends of the uprights and are riveted to radially extending ears 14 on collars 15. The collars, as shown in Figures 1 and 2 of the drawings, are mounted on the uprights and are secured against vertical displacement relatively thereto by means of cross-bolts 16. The cross-members, like the side members 11, are in the form of angle iron bars. They serve to space the uprights at one side of the rack from the uprights at the other side and are riveted at the ends thereof to ears 17 on the collars 15. The side and cross-members at the bottom portion of the rack are spaced a small distance above the feet 13 and overlie a basin 18. The latter fits between the lower ends of the uprights 10 and serves, as hereinafter described, to catch the drainage or drippings from the pans. The front portion of the basin projects forwardly of the two uprights at the front portion of the rack. A vertically extending pipe 19 is connected to, and extends downwardly from, the central portion of the basin 18. This pipe constitutes an outlet or drain for the basin and leads to a sewer or tank (not shown). In addition to the uprights, side members and cross-members, the rack comprises angle bars 20 for supporting the pans 9 in vertically spaced relation between the uprights. These bars extend between the front uprights and the rear uprights and embody vertically extending webs 21 and inwardly extending webs 22. They are arranged in pairs and, as shown in Figure 3, are inclined in such manner that the front ends thereof are lower than their rear ends. There is one pair of bars for each pan and the bars of each pair are disposed in opposed relation. The front ends of the vertically extending webs 21 of the angle bars 20 fit directly against and are welded to the front uprights of the rack and the rear ends of such bars fit against and are welded to the rear uprights. The inwardly extending webs 22 are formed integrally with the bottom margins of the vertically extending webs 21 and are designed to underlie and support the side portions of the pan bottoms. The front ends of the inwardly extending webs 22 are bent upwards and form stops 23 for preventing forward sliding movement of the pans when the latter are disposed in their normal position, that is, when they are supported or carried by the angle bars 20. The stops, as shown in Figure 3, are arranged so that they are substantially flush with the front parts of the uprights 10 of the rack.

The pans 9 are adapted to be filled with offal such as head trimmings, snouts, ears, tongues, hearts and sweetbreads and serve as retaining means for the offal during cooling or refrigeration of the latter. They are formed from plate metal blanks of the type that is exhibited or shown in Figure 5 of the drawings and comprise flat rectangular bottoms 24, sides 25, backs 26 and fronts 27. The sides 25 extend upwardly at right angles to the pan bottoms and have the upper margins thereof bent outwardly and then downwardly and inwardly to form side flanges 28. The latter serve to reinforce the sides 25 and are adapted to fit against the vertically extending webs 21 of the angle bars 20 when the pans are supported in vertically spaced relation by the angle bars of the rack. The sides are coextensive with the side margins of the pan bottoms and are cut away at the front ends thereof so that the front edges thereof extend upwardly and inwardly at substantially an angle of 45° with respect to the pan bottoms. The bottom corners of the front ends of the sides are rounded. The front ends of the reinforcing side flanges 28 terminate adjacent to the upper corners of the front ends of the sides 25 and are rounded or beveled so that they do not present sharp edges. The backs 26 of the pans are the same in height as the sides 25. They are coextensive with the back margins of the pan bottoms 24 and are welded at their ends to the adjacent or contiguous end edges of the sides 25. The upper margins of the pan backs 26 are bent outwardly and then downwardly and inwardly so as to form flanges 29. These flanges serve to reinforce the pan backs 26 and are welded at the ends thereof to the contiguous ends of the side reinforcing flanges 28. The fronts 27 of the pans extend upwardly and inwardly at substantially right angles to the pan bottoms and have the upper margins thereof bent downwardly and outwardly and then upwardly and inwardly to form front reinforcing flanges 30. The end margins of the pan fronts lap and are welded to the angled front edges of the sides 25 of the pan and the bottom margins of the pan fronts are rounded conformably to the rounded lower corners of said front ends of the pan sides and have a plurality of equidistantly spaced holes 31 therein. These holes, as shown in Figure 7, project downwardly and outwardly and the bottom portions thereof are substantially flush with the top faces of the pan bottoms. They are formed in the pan blanks prior to bending of the latter into pan form and permit the blood, slime, and other liquid substances which accompany or are associated with the offal to drain from the pans. The bottom margins of the pan fronts 27 constitute the front corners of the pans. The ends of the front reinforcing flanges 30 terminate adjacent to the end edges of the pan fronts 27, as shown in Figure 6. When the pans are mounted in place on the rack, they are held by the angle bars 20 in vertically spaced relation and in a forwardly and downwardly inclined position and the front corners thereof are vertically aligned with and abut against the stops 23, as shown in Figures 2 and 3. In this position of the pans the blood, slime and other liquid substances run or flow downwards over the pan bottoms 24 and drain from the pans by way of the holes 31. The fronts 27 because of their angularity serve as deflectors for the drainage or drippings, and as a result the drainage, instead of dropping from one pan into the subjacent pan, successively contacts and is deflected by the pan fronts until it reaches the bottom of the rack, where it drops into the basin 18. Because of the deflector action of the fronts the apparatus as a whole is sanitary and the drainage or drippings from the offal of one pan cannot contaminate the offal in any of the subjacent pans. The central and upper portions of the pan fronts project or extend rearwardly to such an extent that there is no likelihood that the drainage, which has a tendency to flow rearwards a slight distance before dropping from the front corners of the pans, will enter the pans.

In using the apparatus the pans 9 are removed from the rack and taken to the point in the slaughtering or meat packing establishment where trimming or cutting of the offal takes place. After being filled with offal the pans are returned to the rack in the cooling room and are slid into supported relation with the angle bars 20. While retained in the pans the offal is cooled and the blood, slime, and other liquid are drained therefrom. As hereinbefore pointed out, such substances run or flow down the pan bottoms and then drain from the pans by way of the holes 31 and after successively engaging the upwardly and inwardly inclined pan fronts 27, drop into the basin 18. Ordinarily the offal remains in the pans until it is chilled to the desired extent and the liquid substances have all drained therefrom. If desired, the pans may be used for storing offals.

The herein described apparatus is comparatively simple as far as construction or design is concerned and is characterized by the fact that although the pans are retained in the rack in vertically spaced relation and in an inclined manner for draining purposes, drainage cannot drop from one pan into the pan next below. The apparatus is further characterized by the fact that the drainage, due to the deflecting action of the pan fronts, does not come in contact with any portion of the rack and hence cannot accumulate on the rack.

The invention is not to be understood as restricted to the details set forth, since these may be modified within the scope of the appended claims, without departing from the spirit and scope of the invention.

Having thus described the invention, what I claim as new and desire to secure by Letters Patent is:

1. An apparatus adapted for use in cooling or storing offal and comprising a rack, a plurality of offal retaining pans of like size and shape carried by the rack so that they are disposed in vertically spaced and aligned relation and inclined in one direction and having drain holes in the lower corners thereof, and means attached to the lower portions of the pans and extending from one side of the pans to the other for deflecting the drainage so that it does not drop from one pan into a subjacent pan.

2. An apparatus adapted for use in cooling or storing offal and comprising a rack, a plurality of offal retaining pans carried by the rack so that they are disposed in vertically spaced relation and inclined in one direction and having drain holes in the lower corners thereof and the wall forming parts above said holes extending upwards and inwards to form deflectors whereby the drainage is precluded from dropping from one pan into a subjacent pan.

3. An apparatus adapted for use in cooling or storing offal and comprising a rack, a plurality of offal retaining pans carried by the rack so that they are disposed in vertically spaced relation and forwardly and downwardly inclined and having drain holes in the front corners thereof and their fronts inclined upwardly and inwardly at an angle of substantially 45° with respect to the pan bottoms so as to form deflectors whereby the drainage is precluded from dropping from one pan into a subjacent pan.

4. An apparatus adapted for use in cooling or storing offal and comprising a rack, a plurality of offal retaining pans carried by the rack so that they are disposed in vertically spaced relation and are forwardly and downwardly inclined and having the bottom marginal parts of their fronts curved and provided with drain holes and the central and upper parts of said fronts extending inwardly and upwardly to form deflectors whereby the drainage is precluded from dropping from one pan into a subjacent pan.

5. An apparatus adapted for use in cooling or storing offal and comprising a rack, a plurality of offal retaining pans carried by the rack so that they are disposed in vertically spaced relation and are forwardly and downwardly inclined, and having the lower marginal parts of their fronts rounded into substantially semicircular form and provided with drain holes and the central and upper marginal parts of said fronts extending upwards and inwards at substantially an angle of 45° with respect to the pan bottoms to form deflectors whereby the drainage is precluded from dropping from one pan into a subjacent pan.

6. As a new article of manufacture, an offal retaining pan adapted to be held in a forwardly and downwardly inclined position beneath a similarly constructed pan, and having drain holes in the front corner thereof and its front extending upwardly and inwardly in order to deflect outwards and downwards drainage from said similarly constructed pan.

7. As a new article of manufacture, an offal retaining pan adapted to be held in a forwardly and downwardly inclined position beneath a similarly constructed pan, and having drain holes in the lower margin of its front and the central portion and upper margin of said front extending upwardly and inwardly at approximately an angle of 45° with respect to the pan bottom in order to deflect drainage from said similarly constructed pan.

8. As a new article of manufacture, an offal retaining pan adapted to be retained at a forwardly and downwardly extending angle and comprising a flat rectangular bottom, a pair of sides extending upwardly from the side margins of the bottom and provided with mitered front ends, and a deflector type front formed integrally with and extending upwardly and inwardly from the front margin of the pan bottom and having drain holes along the bottom margin thereof and its ends fitting against and secured to the mitered front ends of the sides.

9. As a new article of manufacture, an offal retaining pan adapted to be held in a forwardly and downwardly inclined position and comprising a rectangular bottom, a pair of sides extending upwardly from the side margins of the bottom and having the front ends thereof cut so that the front edges extend upwardly and inwardly at substantially an angle of 45° and their lower corners are rounded, and a deflector type front extending upwardly and inwardly from the front margin of the pan bottom and having the bottom margin thereof provided with drain holes and curved conformably to the curved lower corners of the front ends of the sides and their ends fitting against and secured to said front edges of the sides.

10. As a new article of manufacture, an offal retaining pan adapted to be held in a forwardly and downwardly inclined position and comprising a rectangular bottom, a pair of sides extending upwardly from the side margins of the bottom and provided with mitered front ends, and a deflector type front extending upwardly and inwardly from the front margin of the pan bottom and having drain holes along the bottom margin thereof and also having its ends fitting against and secured to the mitered front ends of the side and its upper margin bent outwardly and downwardly in order to form a reinforcing flange.

ALVIN O. LUNDELL.